GRAF BOTHO SCHWERIN.
METHOD OF PURIFYING AND SEPARATING FINELY DIVIDED SUBSTANCES.
APPLICATION FILED JAN. 5, 1912.

1,229,203.

Patented June 5, 1917.

UNITED STATES PATENT OFFICE.

GRAF BOTHO SCHWERIN, OF FRANKFORT-ON-THE-MAIN, GERMANY, ASSIGNOR TO GESELLSCHAFT FÜR ELEKTRO-OSMOSE, M. B. H., OF FRANKFORT-ON-THE-MAIN, GERMANY, A CORPORATION.

METHOD OF PURIFYING AND SEPARATING FINELY-DIVIDED SUBSTANCES.

1,229,203.   Specification of Letters Patent.   Patented June 5, 1917.

Application filed January 5, 1912. Serial No. 669,622.

*To all whom it may concern:*

Be it known that I, BOTHO SCHWERIN, a subject of the Emperor of Germany, and residing at Holbeinstrasse 35, Frankfort-on-the-Main, Germany, have invented certain new and useful Improvements in Methods of Purifying and Separating Finely-Subdivided Substances, of which the following is a specification.

This invention relates to a method of conducting electro-osmotic processes, that is to say the utilization of the effects of the electric current on the transport of the smallest particles in a suspension, a mixture of suspensions or in so-called colloidal solutions.

Electro-osmotic processes are particularly suitable for purifying and separating from mixtures finely subdivided substances in suspension or in colloidal form and the present invention achieves the separation from each other of the finest or colloidal particles in a mixture, as well as a purification of the desired fraction from foreign matters and finally a more or less considerable separation of water from the mass depositing on the electrode.

In the electro-osmotic process the material to be treated is suspended in water or another suitable liquid so as to form a thin mixture or a colloidal solution and to this is added preferably an electrolyte. The latter is advantageously basic when electronegative substances are to be separated and acid when the substances are electropositive. In what follows the treatment of clay, an electronegative substance, will be described as an example, the application of the operations to other substances will then be obvious.

Figure 1:
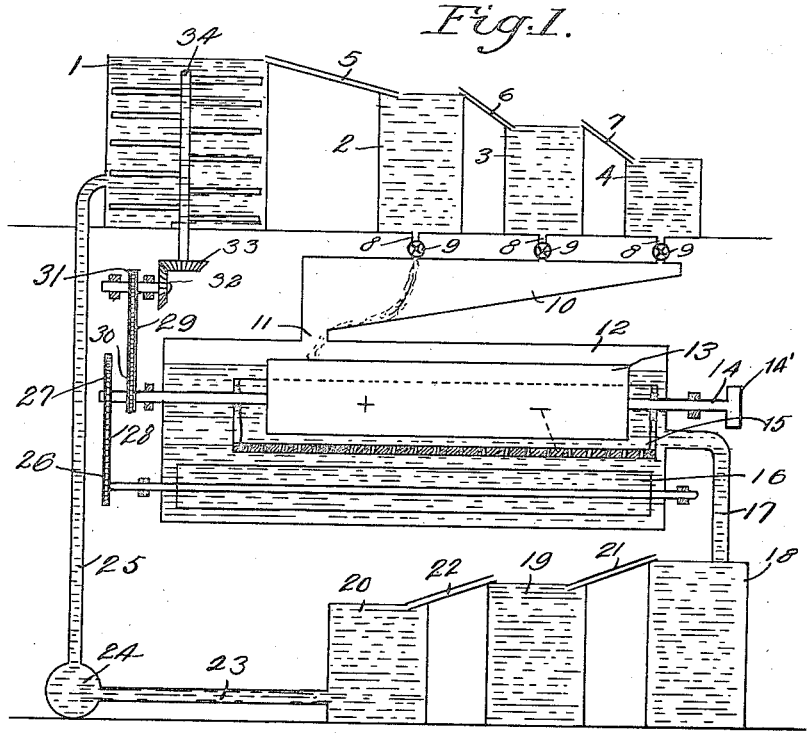
Figure 2:
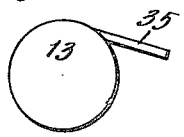

In the drawings, Figure 1 is a diagrammatic view of the apparatus which may be employed, and Fig. 2 is a detail showing means for removing the clay or the like from the anode.

In an agitator comprising a tank 1 and a rotary member 34 the clay substance is suspended in water to form a thin mixture and to this is added a small proportion of a suitable electrolyte, such as sodium hydroxid. The suspension is run into one or more vats or basins 2, 3, 4, and when there are several vats or basins as shown the arrangement may be such that the liquid flows through them in series by means of conduits 5, 6, 7 and the time during which the liquid is to remain in each may be selected as desired. From one or several vats the suspension is now conducted through pipes 8 controlled by valves 9 to an osmose apparatus, that is to say an apparatus wherein the suspension is subjected to the action of an electric current in the manner about to be described. The apparatus may include a casing 12, a shaft 14 carrying an anode member 13, a cathode 15, below the anode, and a rotary member 16 for agitating the suspension. A trough 10 is connected at 11 with the casing 12. Shaft 14 is driven by pulley 14'. The character of the final product is determined by the concentration of the suspension between the electrodes of the osmose-apparatus, the speed of the current and the nature of the added electrolyte, as well as obviously by the strength and tension of the electric current.

The suspension may be removed from the anode member 13 by means of a scraper 35, the water or weakened solution moving in the opposite direction or away from the anode, and being drawn off and again passed through the apparatus, with fresh material.

By the action of a suitable electrolyte, electronegative particles of clay are brought into the so-called sol-condition, that is to say they are set in active oscillation (brownian movement), while the oppositely charged particles are brought in the so-called gel-condition and fall with the coarse particles freed from their incasing clay substance to the bottom. There is a gradual fractionation even of the oscillating electronegative particles in that the coarser of them oscillate for a shorter period and are held in suspension for a shorter time than the finer. After a certain lapse of time the suspension contains only the very finest particles which cannot be made to settle at all or after only the mixture has stood for a very long time.

The liquid containing these particles is now conducted to the osmose-apparatus in which the particles are precipitated on one of the electrodes by action of the current.

Since the time during which the suspension is allowed to remain in the several vats before it is subjected to electro-osmose may be suitably selected, it is possible to win a material of any particular value in respect of size of particle. For example by using several vats it may be arranged that the impurities, such as sand, chalk, iron compounds or the like, settle in the first vat, while in the second clay substances of a size and particle between definite largest and smallest limits settle, and in the third further fractions of particular size of particle but smaller than that of the second vat are deposited. The osmose-apparatus then yields a material of the desired degree of fineness and of high purity in a coherent form.

The combination of the settling process with the electro-osmotic process, which constitutes the essence of this invention, gives a large number of possible variations. It therefore possesses the advantage that it allows both of the choice of a particular size of particle to be obtained from the material, and also the choice of a particular fraction to be separated from the mixture in suspension.

Besides this essential advantage in respect of the final product, the combination comprises a further advance in that it relieves the osmose apparatus from certain particles which hitherto have been allowed to flow through the apparatus and must therefore be separated therein by use of consumption of electrical energy, are now separated before the suspension enters the osmose apparatus. Current is thus saved.

The method hereinbefore explained may be still further improved by conducting it with the circulation of the liquid. The suspension flowing away from the osmose apparatus through pipe 17 may be received in one or several vats in which further separations occur according to the conditions of the electro-osmotic operation in the osmose apparatus. From these vats 18, 19, 20, connected by conduits 21, 22 the suspension is pumped back into the aforesaid agitator through pipe 23, chamber 24 and pipe 25 in order once again to be enriched by addition of fresh material. By running the suspension several times through the osmose apparatus in this manner, it becomes more and more freed from acid substances which wander toward the anode and are separated with the clay. The more the suspension is freed from acid substances the more the action of the suitable electrolyte preponderates with the result that the separation of the substances is sharper and the separated particles are drier, that is to say more solid. Whereas in many cases the separated materials are rich in water when the circulation is not used, they are poor in water when the circulation is applied, and this generally means that they are obtained in a coherent condition.

In the osmose apparatus the suspension may be treated in different manners. It has been found to be particularly advantageous to pass the suspension by means of a stirrer 16 through a perforated cathode 15. The suspension passes here a layer enriched in water by electro-osmotic separation of water and alkali owing to electrolytic separation of alkali. Hereby new separations occur and the suspension enters in highly charged condition into the space between the electrodes. Shaft 14 of anode member 13 may drive a sprocket wheel 27, a chain 28, a wheel 26 and a stirrer 16; also wheel 30, chain 29, wheel 31, gears 32, 33, and stirring device 34.

When the suspended matter passes through the perforated cathode, the suspended particles pass rapidly from the cathode to the anode, and on account of this there is around the cathode a watery stratum poor in solids. For the same reason the acids present go to the anode. The watery stratum therefore holds alkali in excess making a zone in which the electrolyte is present in excess, so that the separation of the suspended matter is hastened.

As already stated the concentration of the suspension prevailing between the electrodes has an effect upon the process and it has been found that the current yield depends on the concentration; that is to say the yield per unit of current is more favorable as the concentration of the suspension increases. The stirrer has the further advantage of preventing impoverishment in the anode chamber. Instead of the stirrer any other suitable device for imparting to the liquid the necessary speed and direction may be used.

Having now particularly described and ascertained the nature of my said invention and in what manner the same is to be performed, I declare what I claim is:

1. The process of separating finely divided substances which consists in separating a mass of the substances into separate fractions, subjecting one of the said fractions to electro-osmosis, withdrawing the liquid between the electrodes of the electro-osmotic machine, and conveying the liquid so withdrawn to receptacles from which it is again conducted to said machine.

2. The process herein described, which consists in separating a mass of finely divided material into fractions in a series of receptacles, subjecting the fractions independently to electro-osmosis, conducting the weakened solution to a tank containing fresh material, and conducting the contents of the tank to said receptacles, for like treatment.

In testimony whereof I affix my signature in presence of two witnesses.

DR. GRAF BOTHO SCHWERIN.

Witnesses:
   HENRY HASPER,
   WOLDEMAR HAUPT.